March 30, 1943.   S. FISCHER   2,315,115
ADJUSTABLE BRIDGE FOR GOGGLES
Filed Sept. 17, 1941
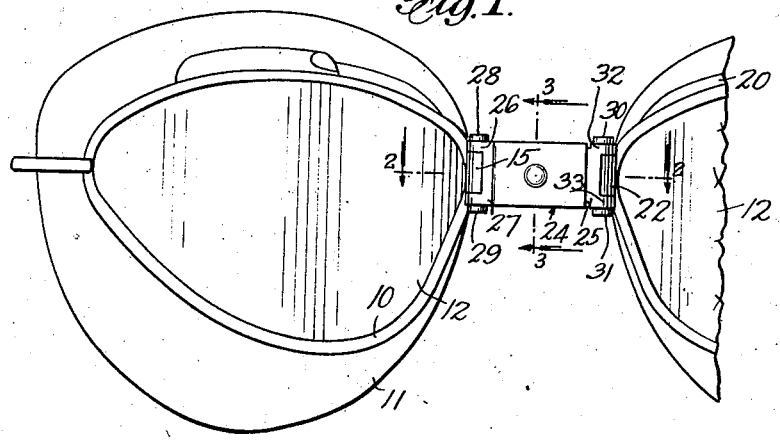
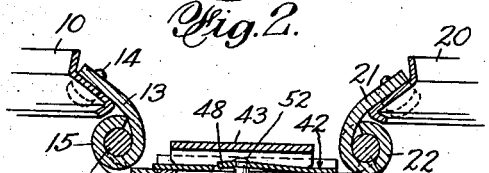
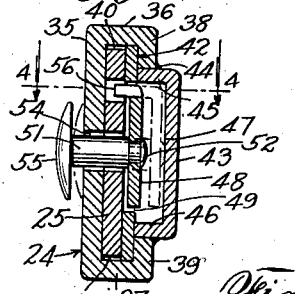
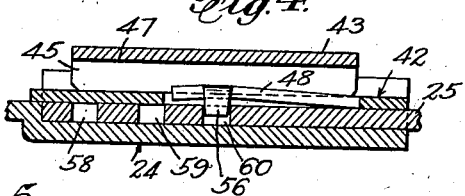
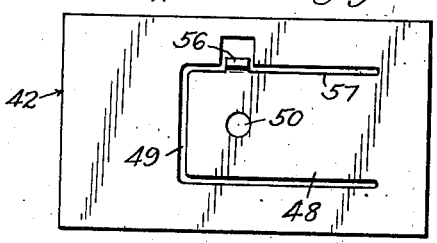
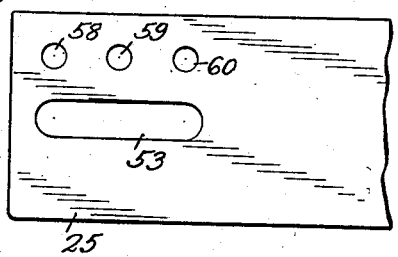
INVENTOR
Sidney Fischer
BY
ATTORNEY Patented Mar. 30, 1943

2,315,115

UNITED STATES PATENT OFFICE 2,315,115

ADJUSTABLE BRIDGE FOR GOGGLES

Sidney Fischer, New York, N. Y., assignor of one-half to Emanuel M. Fischer, New York, N. Y.

Application September 17, 1941, Serial No. 411,199

7 Claims. (Cl. 88—43)

This invention relates to eye goggles and particularly to adjustable nose bridges therefor.

The invention contemplates the provision of an adjustable nose bridge whereby the goggle frames may be separated or brought closer together for adjustment to the different eye spacing of different individuals and locked automatically in their adjusted position.

The invention further contemplates the provision of a simple adjustable nose bridge for goggles to which the usual eye frames are hingedly connected, the bridge including manually operable means for releasing the bridge parts prior to the adjustment thereof, and adjustable telescoping parts which are automatically locked in the selected one of a number of possible adjusted positions.

The various objects of the invention will be clear from the description which follows and from the drawing, in which, Fig. 1 is a front view of a pair of goggles to which the invention has been applied, one of the goggle frames being partly broken away.

Fig. 2 is a horizontal section of the adjustable bridge taken on the line 2—2 of Fig. 1.

Fig. 3 is a vertical section of the bridge taken on the line 3—3 of Fig. 1.

Fig. 4 is a horizontal section of the bridge taken on the line 4—4 of Fig. 3 and showing the bridge in one of its limiting collapsed positions.

Fig. 5 is an elevational view of the guided member of the bridge.

Fig. 6 is a similar view of the combined spring and locking lug.

In the practical embodiment of the invention shown by way of example, the eye frames 10 and 20 of the usual shape are provided with rubber or the like face guards 11 and with the usual transparent glasses or lenses 12. To the eye frame 10 is secured the fixed hinge member 13 as by the rivets 14 or the like, said hinge member terminating in the hinge loop 15 through which passes the hinge pin 16. To the other similar eye frame 20 is secured a similar hinge member 21 provided with the loop 22 and the hinge pin 23.

The improved nose bridge is hingedly mounted on the pins 16 and 23 and comprises a pair of relatively slidable or telescoping parts 24 and 25 and means for automatically locking said parts in their adjusted positions. The part 24 terminates at one end in the pair of spaced loops 26, 27 mounted on the hinge pin 16 on opposite sides of the loop 15, the loop 26 being held in place by the enlarged head 28 of the hinge pin and the loop 27 being similarly held in place by the ring 29 secured to the projecting end of said pin. The hinge pin 23 for the slidable guided part 25 is also provided with a similar head as 30 and with a similar ring as 31 holding the respective loops 32 and 33 formed on the end of said member 25 in place on the pin 23.

As best seen in Fig. 3, the guiding part 24 serves as a guide for the telescoping movement therein of the slidable guided part 25. For this purpose, the part 24 is formed with a front wall 35 from which are bent the flanges forming the respective side walls 36 and 37, which side walls terminate respectively in the shorter rear walls 38 and 39 parallel to the front wall and spaced sufficiently therefrom to provide the grooves 40 and 41 for the sliding movement of the part 25. Said grooves are slightly deeper than the part 25 to permit the insertion between said part and the walls 38, 39 of the flat sheet metal spring member 42. A rear protecting member or guard 43, U-shaped in cross-section may be inserted between and secured to the innermost edges of the walls 38 and 39 by solder 44 or the like and with the free edges of the flanges 45, 46 thereof in engagement with the peripheral portions of the rear face of the spring member 42. The rear wall 47 of said guard 43 is spaced laterally sufficiently from the spring member 42 to permit lateral unlocking movement of the central spring portion 48 of said spring member and to limit such movement. The guard 43 may be omitted, however, if desired.

The spring 48 is separated from the remainder of the spring member 42 by a suitable substantially U-shaped slit or slot as 49 having two parallel portions connected by a portion perpendicular to the parallel portions so that the spring 48 may be moved laterally relatively to the remainder of said spring member. To accomplish such movement, the flat spring 48 is perforated as at 50 for the reception of the end portion of the manually operated finger pin 51, which pin is reduced in diameter to form a shoulder headed as at 52 on to the rear face of the spring 48. The remainder of the pin passes loosely through the horizontally elongated slot 53 of the part 25 and through the opening 54 of the part 24 and at the front of the bridge is provided with an enlarged head 55 adapted to be pressed inwardly by the finger of the user when the bridge is to be adjusted. Normally, the spring 48 is arranged in a generally coplanar relation to or in a position flush with the remainder of the spring member 42, in which position the head 55 is spaced substantially in front of the wall 35 of the guiding part 24. The pin may therefore be pushed laterally rearwardly a sufficient distance to unlock the parts before the head of the pin engages the wall 35.

As has been hereinbefore indicated, locking means are provided to maintain and lock the parts 24 and 25 in their adjusted positions. For this purpose, a forwardly extending lug 56 is provided on the edge 57 of the spring 48, said lug being bent out of and at substantially right angles to the general plane of said spring. Said lug may be made integral with the spring by cutting part of the material adjacent the slot 49 away from the marginal part of the spring member 42, as best shown in Fig. 6. To receive said locking lug 56, a series of horizontally spaced openings as 58, 59, 60 determining the adjusted position of the parts 24 and 25 are made in the guided part 25 in the proper position. While three such openings have been shown, it will be understood that the number may be increased or diminished depending upon how many positions of adjustment are required.

The member 42 being made of spring material, the spring 48 thereof normally remains in the same plane as the remainder of said member and resists movement out of said plane. The locking lug 56 therefore is normally arranged in a selected one of the openings 58, 59 or 60. When it is desired to change the effective width of the bridge, the head 55 of the pin 51 is pressed rearwardly thereby bending the spring 48 rearwardly or laterally out of the plane of and relatively to the remainder of the spring member 42 a sufficient distance to withdraw said lug from the opening in which it is inserted. The parts 24 and 25 are consequently freed for relative movement and the hinge members 13 and 21 may be drawn apart or telescoped together, the guided part 25 sliding in the guiding part 24. On such relative movement of the parts 24 and 25, the locking lug 56 slides along the rear face of that portion of the member 42 between the openings 58, 59, 60 until it reaches the next one of said openings. The pin head 55 having been released during such movement, the lug enters the next opening under the influence of the spring pressure of the spring 48 and becomes automatically locked in said opening. If further adjustment is required, the pin head 55 is again pressed and separating or collapsing pressure in the proper direction exerted on the goggle frames or on the hinge parts 13 and 21 and the operation repeated until the required bridge width is attained. The extent of the adjustment is limited in both directions by the ends of the slot 53, the locking openings 58 and 60 being arranged in the extreme adjusted positions of the bridge.

The parts cannot become accidentally separated, but are automatically locked in the release of the pin and the separating or collapsing movement of the parts 24 and 25 relatively to each other. By arranging the loops 15 and 22 on the hinge members adjacent the innermost parts of the lens frames and in front of said parts, it becomes possible to make the parts 24 and 25 comparatively long and to increase the range of adjustment thereof without causing the nose bridge to become unduly wide in the collapsed positions of the parts.

It will be seen from the above that I have provided a simple, but efficient automatically locking adjustable nose bridge for goggles and that I have provided an adjustable bridge well designed to meet the requirements of practical use.

While I have shown and described certain specific embodiments of my invention, I do not wish to be understood as limiting myself thereto, but intend to claim my invention as broadly as may be permitted by the state of the prior art and the scope of the appended claims.

I claim:

1. In goggles of the character described, and provided with a pair of eye frames, an adjustable nose bridge between the frames comprising a pair of spaced hinge members each secured to one of the frames and each having a loop, a hinge pin arranged in the loop of each member, a guiding bridge part pivoted to the pin of one member and provided with a longitudinal groove, a second bridge part pivoted to the pin of the other member and slidable within the longitudinal groove of the first bridge part and having a longitudinal slot and longitudinally spaced openings therein, a spring member comprising a sheet having a spring portion separated therefrom at the major part of the periphery of the spring portion by slits and carrying a lug adapted to enter a selected one of said openings, and a manually operable member secured to the spring portion and projecting through the slot of the second bridge part and projecting through the first bridge part and headed on the outside of said part, whereby said spring portion may be moved laterally relatively to the remainder of the spring member to remove the lug from its opening and thereby to release the bridge parts for relative longitudinal movement thereby to lengthen and shorten the effective overall length of the bridge.

2. In goggles of the character described, a nose bridge comprising a first apertured bridge part, a second slotted and apertured bridge part, said parts being arranged in telescoping relation, a laterally bendable sheet spring provided with a laterally projecting locking lug urged by said spring to enter the apertures of the second part, and a release member secured to the spring and passing through the slot of the second part and through the aperture of the first part and arranged for lateral movement manually when the bridge is adjusted to withdraw the lug from the aperture of the second part into which said lug is urged.

3. An adjustable nose bridge for goggles comprising a pair of relatively longitudinally slidable bridge parts, spring-pressed means for releasably locking said parts together in various adjusted positions thereof including a laterally movable flat spring and laterally movable locking means on said spring fixed against longitudinal movement relatively to one of said parts and urged by said spring in one lateral direction to engage and lock into the other of said parts, said other of said parts having a slot therein, and manually operable means for moving said spring and locking means in the opposite lateral direction to unlock the locking means comprising a pin having a head arranged in front of said one of said parts and a shank passing through said one part and the slot of the other part and secured to the spring.

4. In goggles of the character described, a pair of eye frames, a hinge member projecting forwardly from the nearest parts of each of said frames, a hinge pin passing through each hinge member and arranged in front of the innermost part of the adjacent frame, a plate-like guiding member pivoted to one of the hinge pins and having a front wall provided with an opening and having side walls and rear walls spaced rearwardly from the front wall to provide a groove therebetween, a slotted plate-like guided member pivoted to the other hinge pin and having a plurality of spaced locking cut-outs therein and arranged to slide in the groove of the guiding member, a flat spring at the rear face of the guided member and fixed against longitudinal movement relatively to the guiding member, a projection on the spring urged by the spring into the cut-outs, and a headed pin fixed to the spring and passing through the slot of the guided member and through the opening of the guiding member.

5. In goggles of the character described, a pair of eye frames, a guiding member pivoted to one of said frames and having a guiding groove therein, a guided member provided with spaced locking walls pivoted to the other frame and slidable in the groove, said guided member having a longitudinal slot therein, and releasable means for locking the guided member in various selected positions in the groove comprising a laterally movable projection spring-pressed forwardly towards and into selective engagement with the locking walls, a release member passing through the slot and through the guiding member and fixed to the projection and thereby securing the projection against longitudinal movement relatively to the guiding member.

6. In an adjustable nose bridge for goggles, a guiding member terminating at one end in a loop pivoted to the goggles, said member having a guiding groove therein, a guided member slidable in the groove and terminating at an opposite end in a loop pivoted to the goggles at a point in variable spaced relation to the first mentioned loop on the relative sliding movement of the members, said guided member having a slot therein, means for releasably locking the members together including a spring-pressed laterally movable lug fixed against longitudinal movement relatively to one of the members and urged to enter the other member, and a manually operable laterally movable finger member having an operative connection to the lug to disengage the lug from said other member, said finger member passing through the slot of the guided member and passing loosely through the guiding member and having an enlarged head arranged in front of the guiding member.

7. In an adjustable nose bridge for goggles having eye frames, a guiding member pivoted at one end to one of the frames and having a guiding groove therein open at one end and at least partly closed at its front, rear and at the other end, a guided member slidable in the groove and provided with spaced locking walls formed by cut-outs therein and pivoted at one end to the other eye frame, said guided member having a longitudinal slot therein, a spring-pressed laterally movable locking member adapted to selectively engage the locking walls to lock the guiding and guided members together in various adjusted positions, and means for disengaging the locking member from the locking walls when the guiding and guided members are to be moved relatively to change the adjustment of the bridge comprising a pin having a head arranged at the front of the guiding member and a shank passing loosely through the guiding member and through the slot of the guided member and secured to the locking member and movable laterally therewith.

SIDNEY FISCHER.